Aug. 19, 1958    A. N. HALE    2,847,956
SEWING MACHINE NEEDLE POSITIONING MEANS
Original Filed Aug. 20, 1951    7 Sheets-Sheet 1

WITNESS
N. Leszczak

INVENTOR.
Arthur N. Hale
BY
William P. Stewart
ATTORNEY

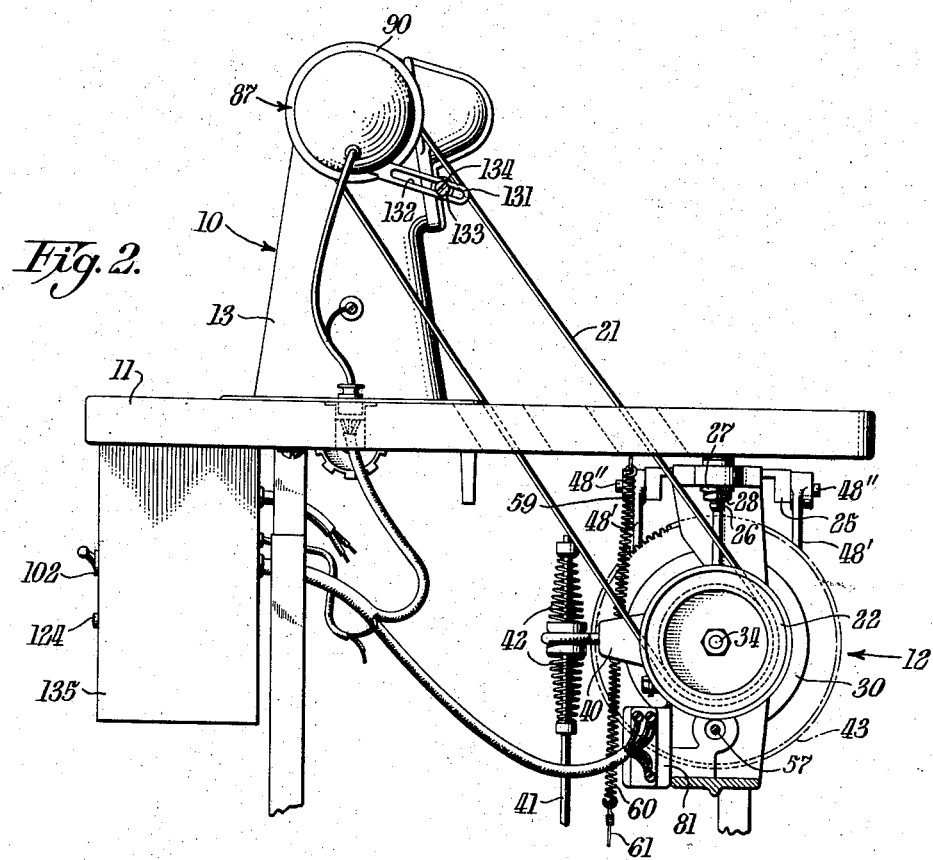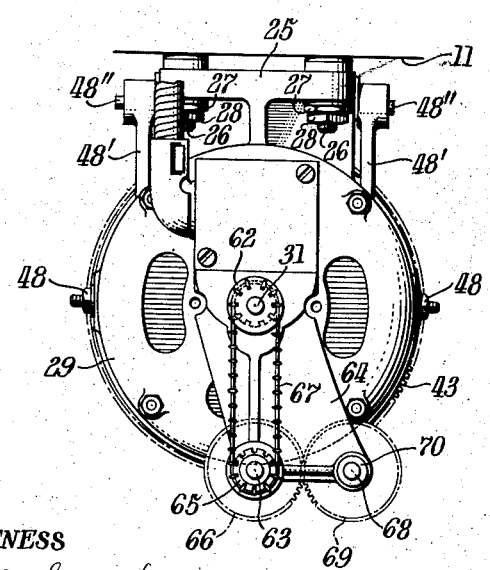

Aug. 19, 1958     A. N. HALE     2,847,956
SEWING MACHINE NEEDLE POSITIONING MEANS
Original Filed Aug. 20, 1951     7 Sheets-Sheet 3

WITNESS
N. Leszczak

INVENTOR.
Arthur N. Hale
BY
William P. Stewart
ATTORNEY

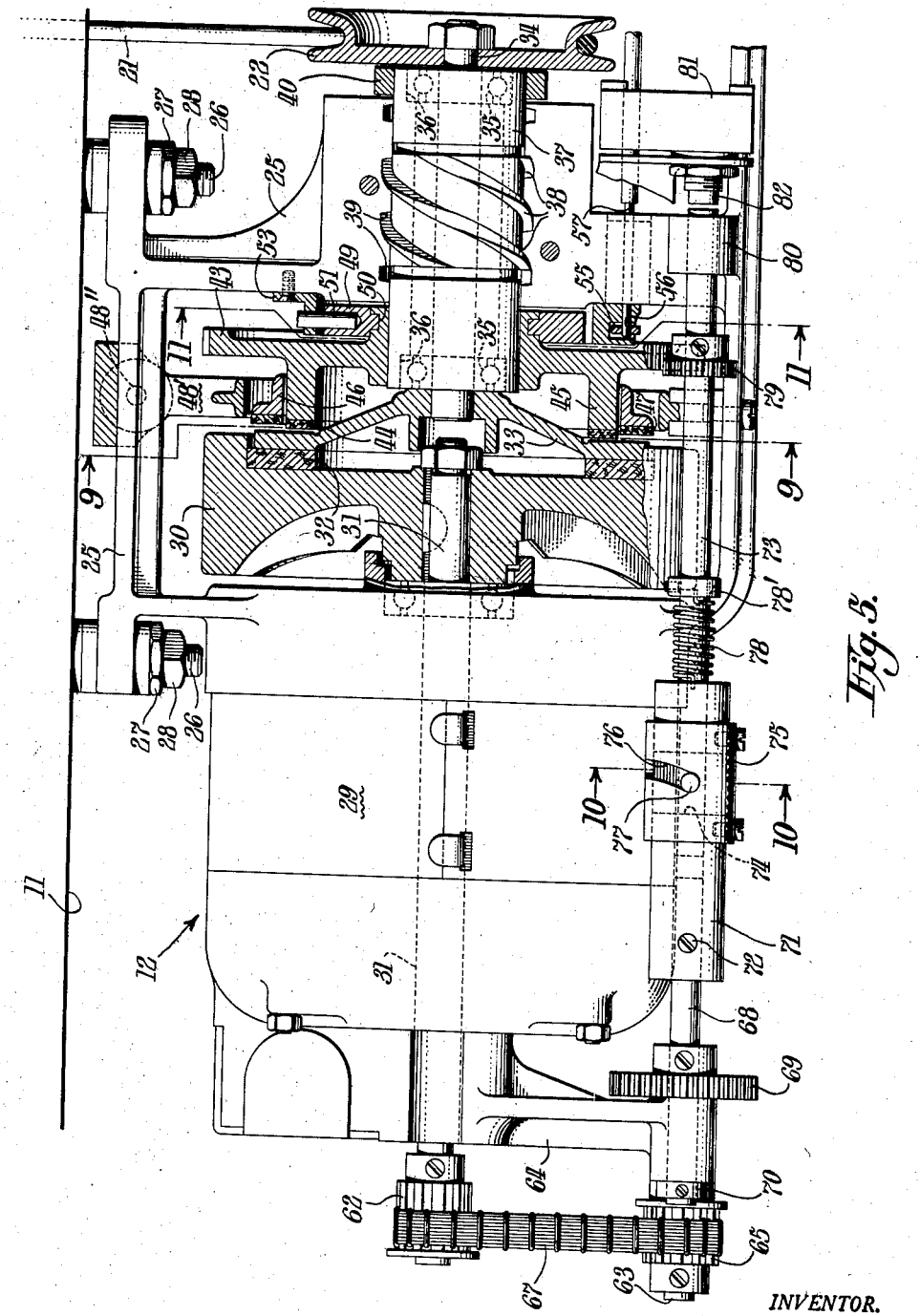

Aug. 19, 1958　　　A. N. HALE　　　2,847,956
SEWING MACHINE NEEDLE POSITIONING MEANS
Original Filed Aug. 20, 1951　　　7 Sheets-Sheet 5

WITNESS
N. Leszczak

INVENTOR.
Arthur N. Hale
BY
William P. Stewart
ATTORNEY

Aug. 19, 1958  A. N. HALE  2,847,956
SEWING MACHINE NEEDLE POSITIONING MEANS
Original Filed Aug. 20, 1951  7 Sheets-Sheet 6
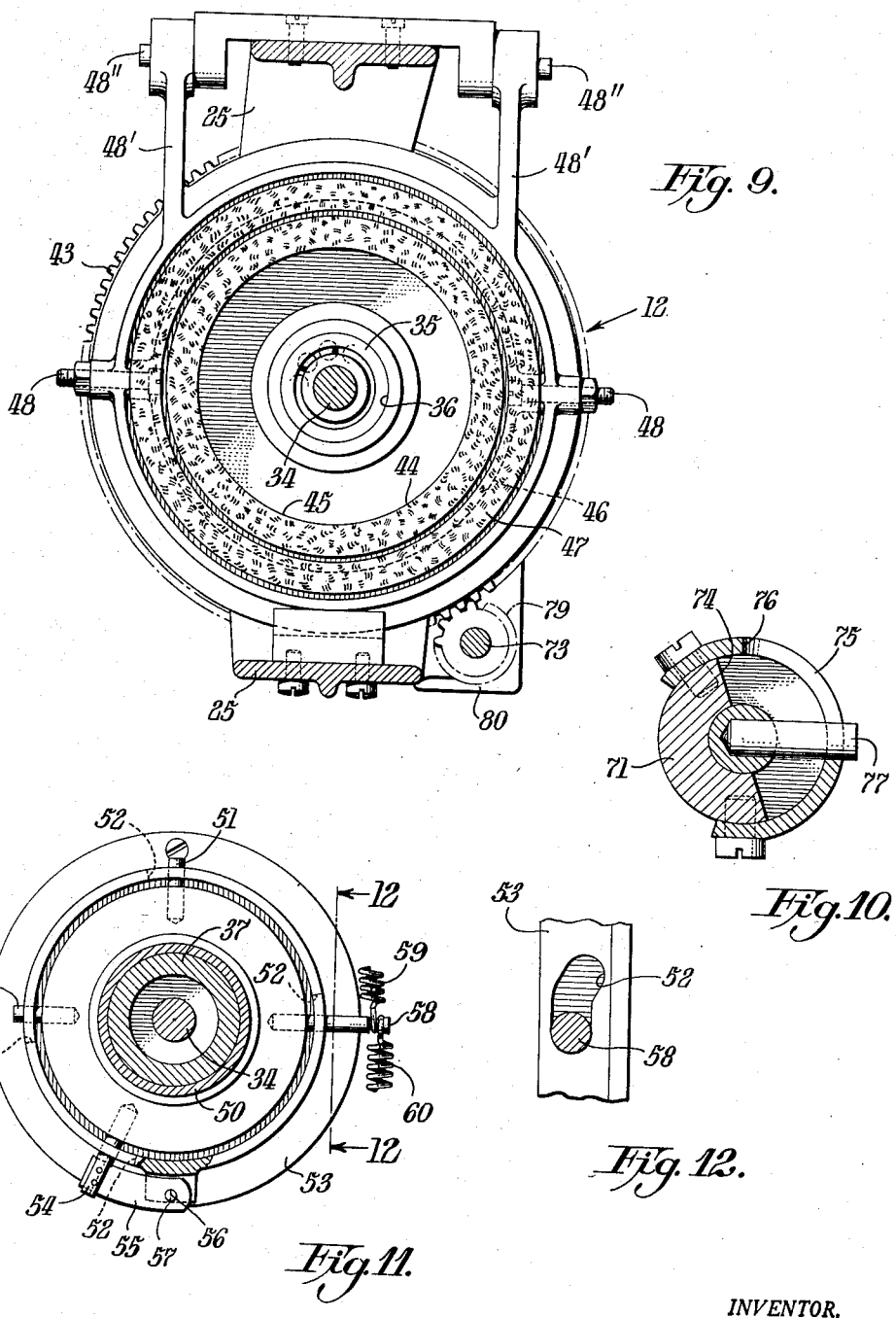
WITNESS
N. Leszczyk
INVENTOR.
Arthur N. Hale
BY
William P. Stewart
ATTORNEY Aug. 19, 1958 A. N. HALE 2,847,956
SEWING MACHINE NEEDLE POSITIONING MEANS
Original Filed Aug. 20, 1951 7 Sheets-Sheet 7

INVENTOR.
Arthur N. Hale
BY
William P. Stewart
ATTORNEY

WITNESS
N. Leszczak

United States Patent Office 2,847,956
Patented Aug. 19, 1958

2,847,956

SEWING MACHINE NEEDLE POSITIONING MEANS

Arthur N. Hale, Park Ridge, Ill., assignor to The Singer Manufacturing Company, Elizabeth, N. J., a corporation of New Jersey Continuation of application Serial No. 242,715, August 20, 1951. This application June 9, 1955, Serial No. 514,145

32 Claims. (Cl. 112—219)

This invention relates to sewing machines and more particularly to a device for controlling the operation of the machines. This application is a continuation of my application Serial No. 242,715, filed August 20, 1951, now abandoned.

An object of the invention is to provide a sewing machine with a mechanism which will assure the stopping of the sewing needle in a predetermined position.

A further object of the invention is to provide a sewing machine with a mechanism which will assure the stopping of the sewing needle in a selected one of a multiple number of predetermined positions.

Another object of the invention is to provide a sewing machine with a mechanism which will assure the stopping of the sewing needle in a selected one of a multiple number of predetermined positions and to provide a device, operable at desired intervals, to assure stopping of the sewing needle in another of the predetermined positions.

A still further object of the invention is to provide a torque-sensing control mechanism for a sewing machine.

Another object of the invention is to provide an electric power transmitter having a controlled braking action and a two speed drive.

Another object of the invention is to provide a braking mechanism for a sewing machine which will absorb the kinetic energy of the moving parts in distinct steps.

In the drawings,

Fig. 2 is a right end view in elevation of the sewing machine and transmitter embodying the invention shown in Fig. 1.

Fig. 4 is a left end view in elevation of the transmitter shown in Fig. 1.

Fig. 5 is a front view of the transmitter showing the clutch and brake mechanism in section.

Fig. 9 is a sectional view of the transmitter taken on line 9—9 of Fig. 5.

Fig. 10 is a sectional view of the torque coupling taken on line 10—10 of Fig. 5.

Fig. 11 is a partial sectional view of the control ring taken on line 11—11 of Fig. 5.

Fig. 12 is a partial sectional view of the control stud taken on line 12—12 of Fig. 11.

Figure 1:
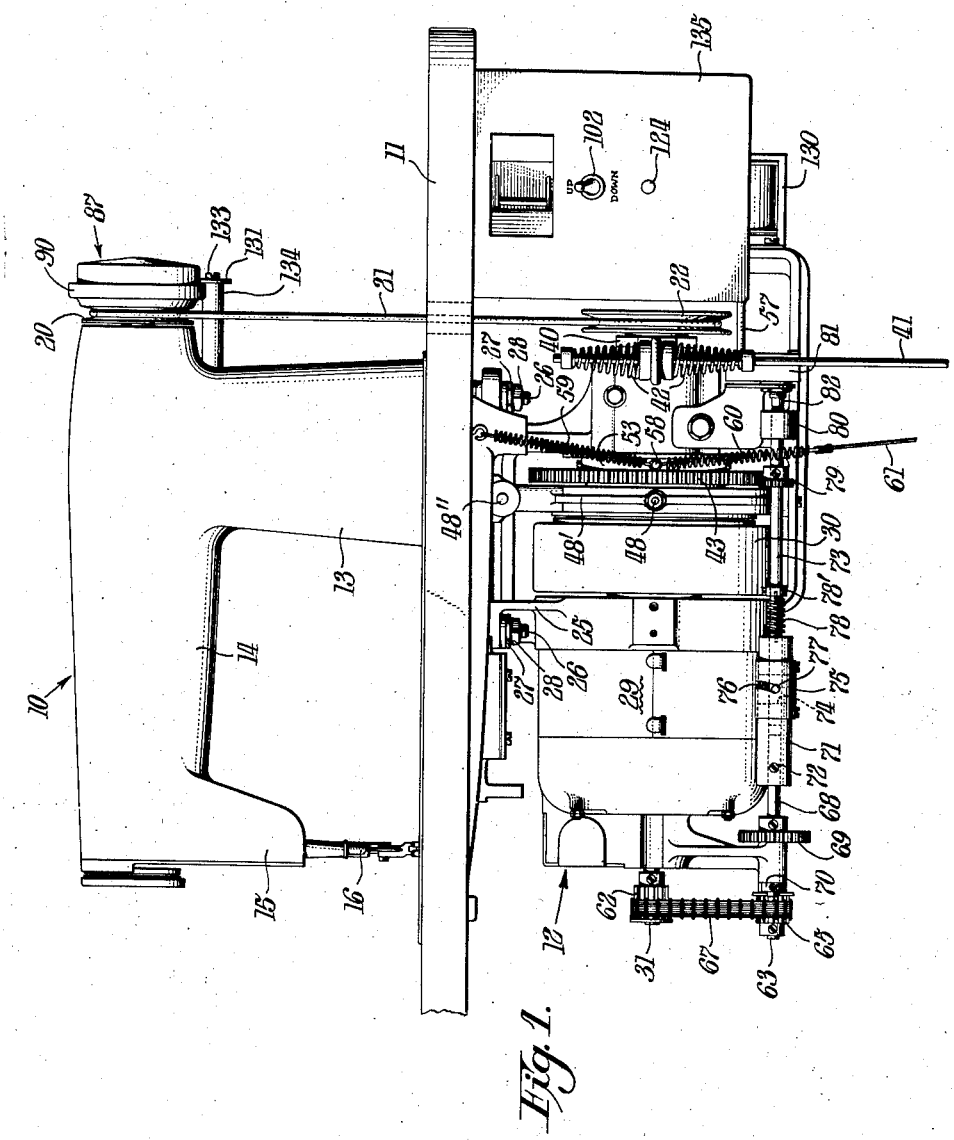
Fig. 1 is a front view in elevation of a sewing machine and transmitter embodying the invention.
Figure 3:
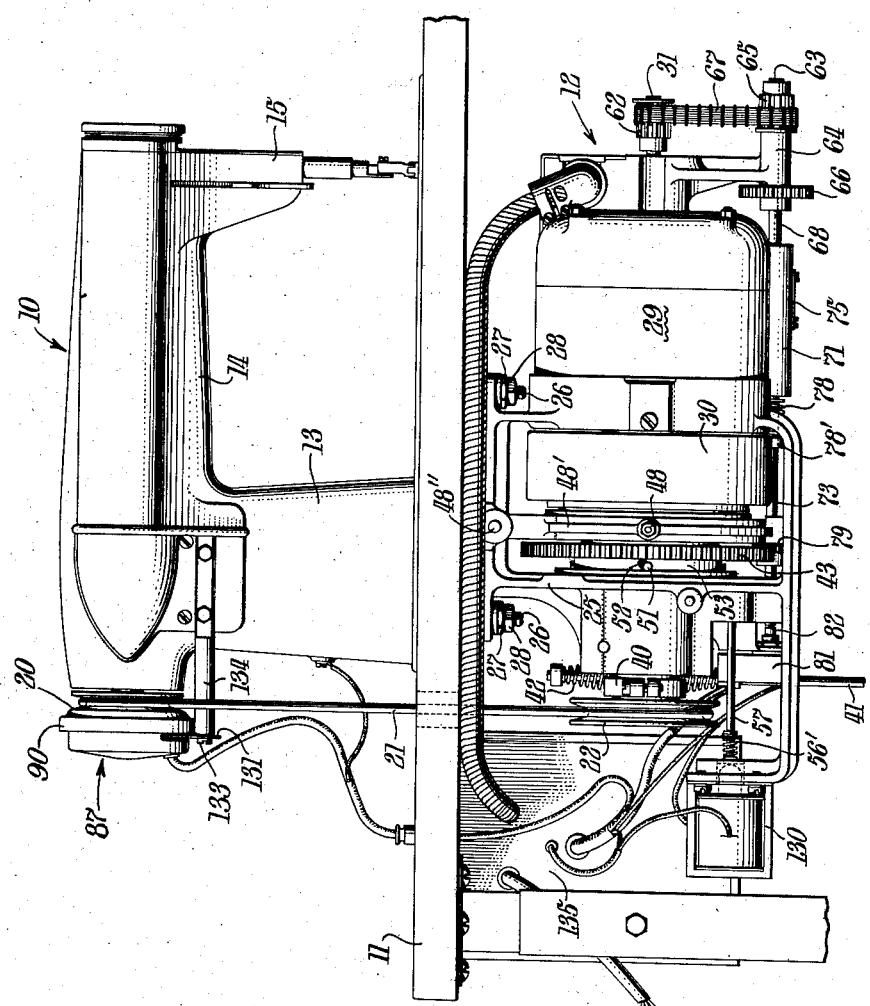
Fig. 3 is a rear view in elevation of the sewing machine and transmitter embodying the invention shown in Fig. 1.

Referring more specifically to the drawings, a sewing machine 10 is mounted on the usual supporting table 11 which also carries an electric power transmitter 12. The sewing mechanism of the sewing machine may be of any conventional type, for example, such as that shown in U. S. Patent No. 2,206,285, dated July 2, 1940. The sewing machine includes the usual bracket-arm 13 having a horizontal portion 14 terminating in a hollow head 15. A needle-bar 16 is supported in the hollow head 15 for reciprocatory motion and is pivotally connected to one end of a connecting link 17. The link 17 is pivotally connected to a crank 18 fastened to one end of an actuating shaft 19 rotatably journaled in the sewing machine bracket-arm 13. Power is supplied to the actuating shaft 19 from a driving pulley 20 driven through a belt 21 from a pulley 22. The pulley 20 is attached to a hub 23 which is secured to the shaft 19 by a set screw 24.

The electric power transmitter 12 includes a frame 25 fastened to the bottom of the table 11 by bolts 26, nuts 27, and locknuts 28. A driving motor 29 is fastened to the frame 25 and carries a flywheel 30 fastened to one end of the motor rotor shaft 31. One face of the flywheel is recessed to receive a clutch facing 32 which is fastened to the flywheel 30. A driven disc 33 is fastened to a driven shaft 34 which carries the driven pulley 22. The driven shaft 34 is journaled in bearings 35 fitted in counterbores 36 in the operating sleeve 37. Helical ridges 38 are provided on the outer surface of the sleeve 37 which operate in corresponding helical grooves 39 in the frame 25. An operating lever 40 is fastened to the outer end of the sleeve 37 and is attached to the usual foot treadle (not shown) by a conventional treadle connecting rod 41 and spring device 42.

A large diameter control gear or auxiliary driving gear 43 is journaled on the sleeve 37 and carries a clutch facing 44 of friction material fastened to an axially extending drum portion 45 of the gear 43. A brake ring 46 carrying a friction facing 47 surrounds the drum portion 45 and is pivotally mounted on pivot studs 48 carried by the equalizing ring 48' which is in turn pivotally carried by the frame 25 on pins 48". A control ring 49 surrounds the hub portion of the control gear 43 and is provided with an internal ridge which engages a groove 50 in the control gear hub. Rotary and axial motion of the control ring 49 is limited by pins 51 carried by the ring and positioned in curved cam slots 52 formed in a stationary ring 53 which is fastened to the frame 25. At another point on its periphery, the control ring 49 is provided with a bifurcated stud 54 carrying a brake tail 55 and operating in a slot 52. A hole 56 is provided in the brake tail 55 to receive a plunger pin 57 which is urged through a hole in the frame 25 into the hole 56 by a spring 56'. A control stud 58 fastened to the control ring passes through one of the curved slots 52 and is connected to the table 11 by a spring 59. The control stud is also connected to the foot treadle (not shown) by a spring 60 and rod 61. This mechanism provides a means for connecting the control gear 43 to the disc 33 and also for rendering the connection ineffective.

The transmitter rotor shaft 31 extends from the rear end of the transmitter and carries a pulley 62. A countershaft 63 is rotatably journaled in a support arm 64 integral with the frame 25 and carries a pulley 65 at one end and a gear 66 at the other end. Power is transmitted between the pulleys by a belt 67. A second countershaft 68 is rotatably journaled in the support arm 64 and has a gear 69 fastened thereto and meshing with the gear 66. A collar 70 fastened to the countershaft 68 holds it in position. One end of a torque coupling sleeve 71 is fastened to the countershaft 68 by a set screw 72 while the other end rotatably receives one end of a control shaft 73. An opening 74 in the coupling sleeve is covered by a plate 75 provided with a helical slot 76 which receives a coupling pin 77 fastened to the control shaft 73. Relative rotation between the coupling sleeve 71 and the control shaft 73 is resisted by a coil torque spring 78 which has one end fastened to the coupling sleeve 71 and the other end fastened to a collar 78' attached to the control shaft 73. A gear 79 fastened to the control shaft 73 meshes with the control gear 43. A bearing boss 80 supports the control shaft 73 for both rotary and axial motion. The gear 43 is driven from the rotor shaft 31 at a constant reduced speed.

Figure 6:
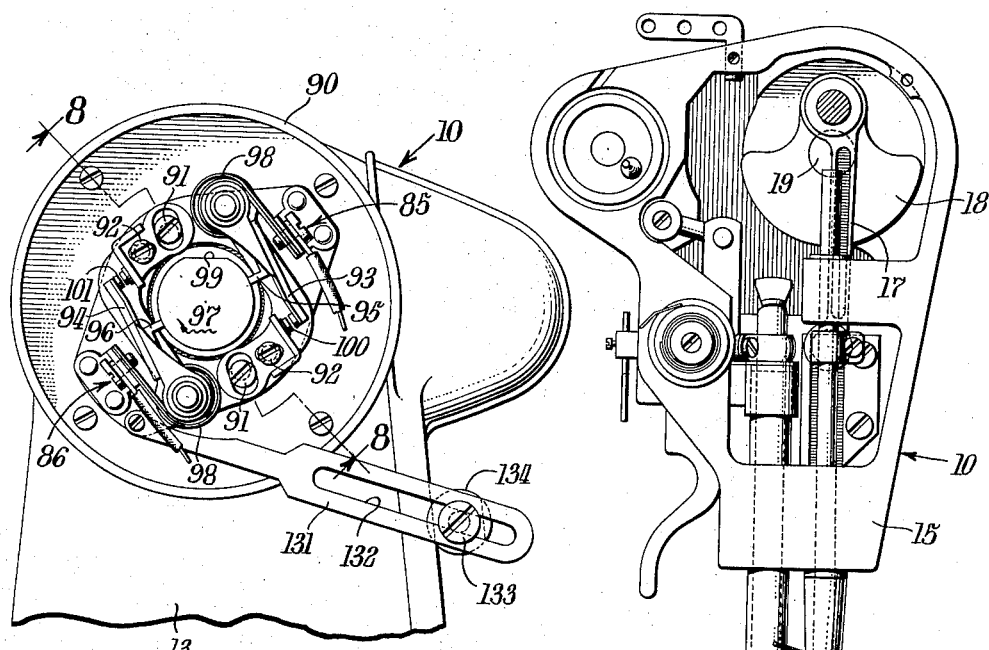
Fig. 6 is a partial right end view of the sewing machine showing the timer cover-plate removed.
Figure 7:
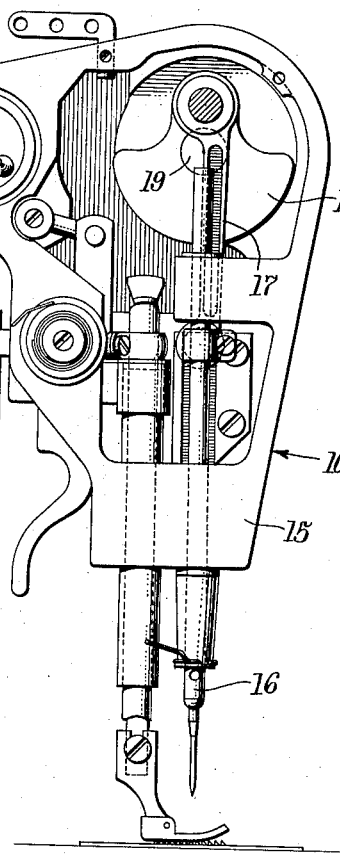
Fig. 7 is a left end view of the sewing machine head with the end plate removed.
Figure 8:
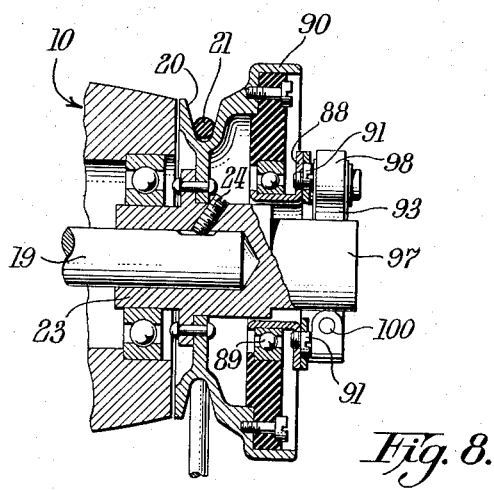
Fig. 8 is a partial sectional view of the balance wheel and timer taken on line 8—8 of Fig. 6.
Figure 13:
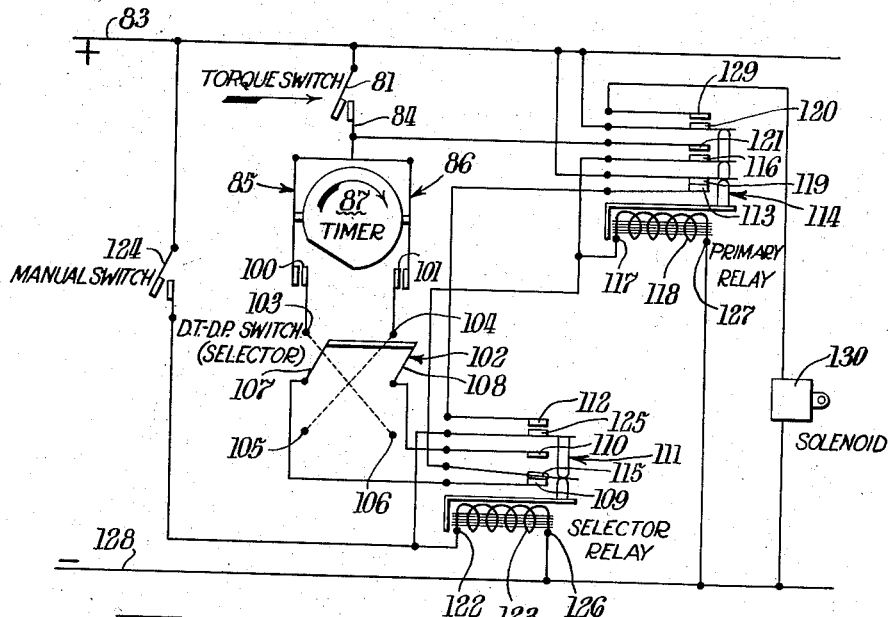
Fig. 13 is a schematic wiring diagram of the electrical control system.

A control switch 81 is mounted on the frame 25 with its operating plunger 82 adjacent the end of the control shaft 73 to be operated by axial movement of the shaft. This control switch in conjunction with the torque coupling and shaft 73 forms a torque or power-flow sensing device. The control or torque switch 81 controls the flow of electric current from one conductor 83 of a power supply line to a conductor 84 connected to the contact assemblies 85 and 86 of a timer 87. The timer 87 comprises an adjusting plate 88 mounted on a bearing 89 for angular adjustment with respect to a sewing machine balance wheel 90. The two contact assemblies 85 and 86 are adjustably fastened to the plate 88 by screws 91 and 92. The contact arms 93 and 94 of the contact assemblies, respectively, carry a follower finger 95 and 96, each of which is urged into contact with a cam 97 by a spring 98. The cam 97 is formed on the end of the hub 23 and is provided with a flat portion 99. The contact assemblies 85 and 86 are adjusted to remain in the open position, shown in Fig. 6, until the follower finger of the contact assembly reaches the flat portion 99 of the cam 97, at which time the contacts 100 or 101 will close, depending on which finger engages the flat portion 99. A double-pole double-throw selector switch 102 having contacts 103, 104, 105 and 106 and switch blades 107 and 108 determines which one of the timer contact assemblies 85, 86 normally controls the electric circuit. Two fixed contacts 109 and 110 of the selector relay are, respectively, connected to the blades 107 and 108 of the selector switch 102. The remaining fixed contact 112 of the selector relay is connected to one fixed contact 113 of a primary relay 114. A movable double contact 115 of the selector relay 111 is connected to one movable contact 116 of the primary relay 114 and also to one terminal 117 of the primary relay coil 118. Two movable contacts 119 and 120 of the primary relay are both connected to the power supply line conductor 83. A second fixed contact 121 of the primary relay is connected to the conductor 84 at one side of the torque switch 81. One terminal 122 of the selector relay coil 123 is connected to the supply line conductor 83 through a normally open manual switch 124 and is also connected to a movable single contact 125 of the selector relay. The other terminals 126 and 127 of the respective relay coils are connected to a second conductor 128 of the power supply line. The remaining fixed contact 129 of the primary relay is connected to the power supply conductor 128 through the coil of a solenoid 130 which operates the plunger pin 57. It should be noted that the selector relay is actuated only when the manual switch 124 is closed. The adjusting plate 88 is held in the desired angular position by a slotted adjusting arm 131 pivotally fastened to the plate 88. A slot 132 in the adjusting arm receives a clamping screw 133 threaded into a stud 134 fastened to the bracket-arm 13. The relays 111 and 114, manual switch 124 and selector switch 102 may be conveniently located in a small box 135 attached to the supporting table 11 within easy reach of the operator.

The construction just described makes it possible for a sewing machine operator to stop the machine with the needle automatically stopping in a predetermined position, such as the top or the bottom of its stroke, without damaging the sewing machine or the transmitter. Earlier attempts to obtain the desired result have abruptly stopped the machine in the desired position by the use of positive brakes such as dental type brakes or stop pins. This results in a tremendous shock and damage to the machine parts, since, even at low speeds, a relatively large quantity of energy must be absorbed instantaneously. My construction permits the machine to be brought to rest with the needle in the desired position without any sudden shock to any of the parts by using a non-positive brake of the friction type which will absorb the kinetic energy of the moving parts relatively gradually.

In the device described, when the sewing machine is operating, the treadle rod 41 is pulled down by the operator's foot pressing on the usual treadle (not shown), which also pulls down the operating lever 40. Since the sleeve 37 is attached to the lever 40, the sleeve is rotated and, due to the cooperating helical ridges 38 and grooves 39, is shifted axially to the left, as viewed in Fig. 5, carrying the shaft 34 and disc 33 with it. This action engages the disc 33 with the friction clutch facing 32 on the flywheel 30 of the constantly running motor 29. Power is then supplied to the machine through the pulleys 22 and 20 and the belt 21. The control gear 43 is driven constantly, at a predetermined reduced speed, through the speed reduction power transmission train previously described, the parts being in the relative positions shown in Fig. 5, wherein the control shaft 73 does not contact the switch actuating plunger 82. It should be noted, also, that the friction facing 44 does not contact the disc 33. The foot pressure of the operator on the treadle also causes the treadle to pull the rod 61 downwardly and through the spring 60, the control stud 58 is pulled downwardly to the bottom of the curved cam slot 52 as shown in Fig. 12, against the tension of the spring 59. When the control stud 58 is in this position the hole 56 in the brake tail 55, carried by the control ring 49, is aligned with the plunger pin 57 and the plunger pin 57 is urged through the hole 56 by the spring 56', thus holding the control ring stationary. Under these conditions, the machine operates in a normal manner at any desired speed.

When it is desired to stop the machine, the operator merely "heels" the foot treadle in the usual manner. This forces the control rod 41 to rise and rotates the control lever 40 and sleeve 37 in the opposite direction from that required to start the machine. The sleeve 37 now moves to the right, as viewed in Fig. 5, and carries the disc 33 into contact with the friction facing 44 carried by the control gear 43. Since the tension has been released on the rod 61, the spring 59 urges the operating stud 58 upwardly, but, the plunger pin 57 remains engaged with the brake tail 55 and prevents the control ring 49 from rotating, thus holding the studs in that portion of the slots 52 which is parallel to the face of the disc 33. Thus, the control ring 49 cannot rotate nor can the control gear move axially. The control gear is held in position with the friction facing 44 extending slightly to the left of the brake facing 47, as viewed in Fig. 5, preventing engagement of the brake.

Assuming the pulley 20 to be rotating clockwise, as viewed from the right end in Fig. 1, at high speed, for example 5000 R. P. M. the kinetic energy stored in the moving parts will tend to turn the control gear 43 clockwise at high speed when the disc 33 and the friction facing 44 contact each other. However, the control gear 43 cannot exceed the reduced speed at which it is positively driven by the electric motor 29. The disc 33 is therefore rapidly braked to the speed of the control gear. If, for example, the control gear rotates at one-eighth of the speed of the rotor shaft 31, the speed of the pulley 20 will be rapidly reduced to 625 R. P. M. Since the kinetic energy in the moving parts varies as the square of the speed, the kinetic energy remaining in the moving machine parts is now only one-sixty-fourth of what it was at 5000 R. P. M.

Once the machine is slowed to the reduced speed of the control gear 43, power must be supplied to keep the control gear rotating at a constant speed. The torque spring 78 is strong enough to transmit only the amount of power required to rotate the control gear 43, without any relative rotation occurring between the shafts 68 and 73. The spring 78, however, is not strong enough to transmit the power required to drive the sewing machine at the reduced speed. Therefore, relative rotation occurs between the shafts 68 and 73, and the coupling pin 77 moves from its normal position shown in Fig. 5 along the helical slot 76. As the pin moves along the slot, the shaft 73 moves axially to the right as viewed in Fig. 5 to strike the switch plunger 82 and close the torque switch 81. This torque-sensing device determines when the machine has reached the constant reduced speed and must be power driven to maintain it.

Assuming that the selector switch 102 is closed, with the switch blades 107 and 108 connected to the contacts 103 and 104, respectively, the electrical circuit is now conditioned to stop the machine in a definite position of the needle. The machine continues to operate at the reduced speed until the contact finger 95 reaches the flat portion 99 of the cam 97 at which time the timer contacts 100 close, completing the electrical circuit through the normally closed selector relay contacts 109 and 115 and the primary relay coil 118. When the primary relay coil 118 is energized, the contacts 120, 129 are closed, completing the circuit through the solenoid 130. Upon energizing the solenoid, the plunger pin 57 is pulled from the hole in the brake tail 55 allowing the control stud 58 and ring 49 to rotate under the tension of the spring 59. Rotation of the control ring 49 permits the studs to move into the curved portion of the slots 52 and thus move the control gear 43 and its friction facing 44 to the right, in Fig. 5, until the facing 44 is located to the right of the brake facing 47, thus releasing the disc 33 from the control gear 43 and permitting engagement of the brake. The disc 33 is now permitted to move further to the right, in the usual manner, to engage the brake facing 47 and come to a complete stop. It should be noted that once the primary relay 114 operates, a holding circuit through the relay coil 118, the torque switch 81 and contacts 116, 121 is completed, so that the timer contacts 100 may open without disturbing the sequence of operations.

Figure 14:
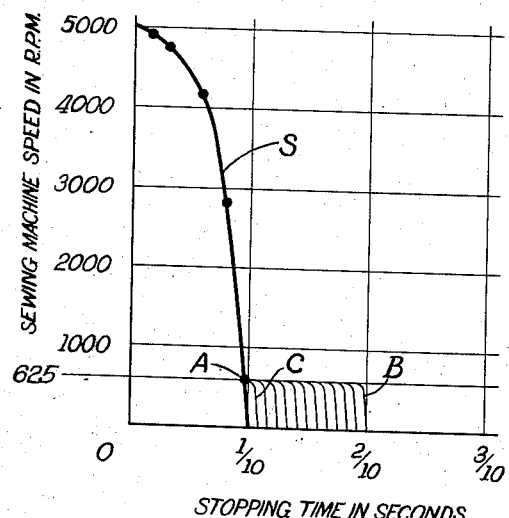
Fig. 14 is a graphical representation of the time required to stop the machine from full speed.

The entire stopping procedure requires only a fraction of a second from the time the operator "heels" the treadle, until the machine is completely stopped. For example, referring to the graph in Fig. 14, it has been determined experimentally that a sewing machine can be brought to a complete stop from 5000 R. P. M. in approximately 1/10 of a second, approximately four revolutions, or braked down to 1/8 of that speed, or about 625 R. P. M., in slightly less time as indicated by the heavy line S of the graph. Since the energy to be absorbed in stopping the machine varies as the square of the speed the stopping distance is reduced proportionately. Therefore, if it requires 4 revolutions or 1440 degrees to stop the machine from 5000 R. P. M., only 1/64 of that, or about 22½°, is required to stop the machine from 625 R. P. M. For any given machine, these values vary only about 10% and can be predicted with accuracy. By adjusting the angular position of the plate 88 about the cam 97, the instant of closing of the timer contacts can be timed to compensate for the electrical lag in the circuit and for the time required to completely stop the machine. Thus, the needle may be automatically stopped in a predetermined position repeatedly, merely by "heeling" the sewing machine treadle in the normal manner.

In certain constructions, it is desirable for the ratio between the pulleys 20 and 22 to be 1:1. In this construction, provided that the connection between the pulleys does not slip, the drive pulley 22, as well as the pulley 20, will stop in the same position each time the machine is stopped.

Where, as in the device disclosed, a second timer contact assembly 86 and a selector switch 102 are provided, the machine may be stopped with the needle in a second position. When the selector switch 102 is positioned to connect the switch blades 107, 108 with the contacts 105, 106, respectively, the circuit functions as described above, but is controlled by the timer contacts 101 instead of contacts 100. Therefore, if the contacts 101 are adjusted to stop the machine when the needle is at the top of its stroke and the contacts 100 are spaced to operate 180° later, the machine may be stopped with the needle at the bottom of its stroke merely by throwing the selector switch 102. The relative positions of the timer contact assemblies 85 and 86 can be adjusted to any desired relationship, but only one timer contact assembly can control the circuit for each position of the selector switch 102, unless the manual switch 124 is closed.

Frequently, it is desirable to stop the machine several times with the needle in one position, for example at the bottom of its stroke, so that the work may be pivoted about the needle, and then to stop the needle in a second position, such as the top of its stroke, so that the work may be removed. This is accomplished by providing the manual or overruling switch 124 connecting one side of the power supply 83 to one end of the selector relay coil 123 and also to the movable contact 125. The sewing machine is operated, as described above, with the selector switch blade 107 connected to the switch contact 103 so that the machine normally stops when the needle is at the bottom of its stroke. When the operator desires to stop the machine with the needle in the raised position, it is only necessary to close the manual switch 124. When this switch is closed, the selector relay 123 operates to open the normally closed contacts 109, 115 and close the normally open contacts 110, 115. Since the contacts 112, 125 are now closed, a holding circuit is completed through the selector relay coil 123, contacts 112, 125 and the normally closed primary relay contacts 113, 119 and the manual switch 124 may be reopened without disturbing the closed circuit. The contacts 109, 115 are now open, so that the timer contact assembly 85 no longer controls the solenoid operation, and the contacts 110, 115 are now closed to place contact assembly 86 in control of the circuit. When the timer contacts 101 close, a circuit is completed through the contacts 101 to cause the primary relay 114 and solenoid 130 to operate the plunger pin 57. Operation of the primary relay opens the contacts 113, 119, thus breaking the holding circuit for the selector relay 111 permitting it to automatically return to its normal position with contacts 109 and 115 closed. When the selector switch 102 is in its other position, the needle normally stops at the top of the stroke but when the manual switch 124 is actuated, the timer contacts 100 control the circuit and the needle will stop at the bottom of its stroke. The manual switch 124 overrules the selector-switch 102, so that whichever timer contact assembly is chosen at the selector switch as the controlling contact, actuation of the manual switch places the other contact assembly in control.

Once the disc 33 engages the brake facing 47 and the facing 44 carried by the control gear 43 is free of the disc, the torque spring 78 returns the pin 77 and the shaft 73 to their positions shown in Fig. 5 and the torque switch 81 opens. When the torque switch 81 opens, the primary relay 114 holding circuit through contacts 116, 121 and 109, 115 is broken, the entire circuit is de-energized and the machine may be started again.

In order to start the machine, the operator merely applies pressure to the treadle of the machine in the normal manner. The disc 33 is moved into contact with the flywheel friction facing 32, as described above, and the control stud 58 is pulled downwardly against the tension of the spring 59. As the stud 58 moves downwardly, it follows the contour of the slot 52 and the studs 51, 54 follow the other slots 52, thus forcing the control ring 49 and the control gear 43 to move to the left, as viewed in Fig. 5. When the stud 58 reaches the bottom of the straight portion of the slot 52, the plunger pin 57 is again urged through the hole 56 in the brake tail 55 by the coil spring 56'. Since the slots 52 permit only limited rotation of the control ring 49, the pin 57, under pressure of the spring 56', merely bears on the surface of the brake tail 55 until it drops in the hole 56. The slots 52 are designed so that the control gear 43 carrying the friction facing 44 closely follows but does not touch the disc 33 as it moves into contact with the flywheel facing 32. This eliminates unnecessary lost motion when the treadle is "heeled." At this point, the machine has returned to its normal operating conditions.

It should be noted that various modifications may be made in the device without departing from the scope of the invention. For example, the shaft 68 may be driven from some constant speed power source other than the motor 29. Further, other types of torque sensing devices may be used to determine when the control gear 43 is receiving power from the control shaft 73 in excess of the amount required to drive only the control gear 43, and the timer may be located in some other position provided that a positive driving connection joins it to the actuating shaft 19.

Referring again to Fig. 14, it should be remembered that various intervals of time may be required to stop the machine after the operator "heels" the treadle. The time interval required to bring the machine from full speed to the reduced speed, represented by a point A, may be, for example, about 1/10 of a second as shown on the graph, for a given machine. This time may vary widely, depending upon the type of operation being performed and the amount of effort the operator applies to the treadle. However, the time required to stop the machine after the torque switch 81 is closed may vary over the time required for one revolution of the actuating shaft 19 at the reduced speed. For example, assuming it is desired to stop the machine with the needle in the raised position, if the machine reaches the point A on the graph and the torque switch closes just after the timer contact 86 has opened, the machine must make another revolution before the timer contact 86 will close again to operate the circuit. At the speeds shown, this requires less than one-tenth of a second, and the machine will come to rest with the needle raised at the end of about two-tenths of a second after the treadle is "heeled" as indicated by the curve B. If, however, the reduced speed point A is reached and the torque switch 81 closes just before the contact assembly 86 closes, the electrical circuit will be immediately energized upon the closing of the contact assembly 86 and the machine will stop with the needle raised in a fraction of a second after the torque switch closes, as indicated by the curve C on the graph. Of course, an infinite range of stopping time to bring the machine to rest from the reduced speed is possible depending on the relative positions of the flat 99 on the cam 97 and the finger of the controlling contact assembly at the time the torque switch closes, but in no event will the time be any greater than that required for one revolution of the actuating shaft 19 at the reduced speed plus the time required to stop the machine from the reduced speed. Further, the needle will always stop in the pre-selected position.

From the foregoing description, it will be readily apparent that I have provided a new and simple mechanism for controlling the position of the sewing needle upon stopping a sewing machine. The mechanism quickly brings the machine to a complete stop without placing any severe strain on any of the machine parts. The mechanism may be readily adapted for use with any sewing machine since only the sewing machine balance wheel is replaced by the balance wheel 90 and the timer 87. Further, the invention may easily be adapted to other types of machines other than sewing machines.

Having thus set forth the nature of the invention, what I claim herein is:

1. A sewing unit comprising a table; a sewing machine mounted on said table and having a frame and an actuating shaft rotatably supported in said frame; a unitary electric clutch-brake motor carried by said table and having a rotor and a driven shaft, said motor including clutch means for operatively connecting said driven shaft to said rotor and brake means for restraining rotation of said driven shaft, operator actuated means for actuating said clutch and brake means, power transmission means operatively connecting said driven shaft to said actuating shaft; first switch means operatively connected to said actuating shaft to be opened and closed in synchronism with rotation of said actuating shaft, a solenoid for controlling engagement of said brake, an electrical circuit operatively connecting said switch means to said solenoid, second switch means operatively connected in said electrical circuit in series relation with said first switch means, and means operable to close said second switch means only when said driven shaft is disengaged from the rotor.

2. A transmission comprising a primary driving member, a secondary driving device including a power-flow sensing device, a driven element, an electric contact device operatively connected to said driven element and having a predetermined control position, connecting means operable to selectively connect said driven element to said member or to said driving device, a friction brake for said driven element, a manual control mechanism for operating said connecting means and said brake, and control means connected to said sensing device and to said electric contact device, operable, when said driving device supplies power to said driven element, and said contact device is in said control position to permit actuation of said brake at a predetermined position of said driven element.

3. A power and stop control mechanism comprising a primary driving member, a secondary driving device including a power-flow sensing means, a rotatable driven element, connecting means independent of said sensing means operable to connect said driven element to said primary driving member for rotation or to said driving device for rotation at a predetermined constant speed, a brake for gradually stopping said driven element, actuating means for said connecting means and said brake, power control means operable to interrupt power flow from said driving device to said driven element, and means connected to said sensing means and to said driven element and operable to actuate said power control means and to permit actuation of said brake only at said predetermined speed and a predetermined position of said driven element.

4. A power and stop control mechanism comprising a primary driving member, a secondary driving device including a power-flow sensing means, a rotatable driven element, an electric contact device operatively connected to said driven element, said contact device having a plurality of predetermined control positions, connecting means operable to connect said driven element to said primary driving member for rotation or to said driving device for rotation at a predetermined constant speed, a brake for stopping said driven element, actuating means for said connecting means and said brake, and means connected to said sensing means and to said contact device and operable to permit actuation of said brake only at said predetermined speed and a selected one of said plurality of predetermined positions of said electric contact device, and selector means operatively connected to said contact device to select the desired one of the predetermined positions of said driven element.

5. A power and stop control mechanism comprising a primary driving member, a secondary driving device including a power-flow sensing means, a rotatable driven element, connecting means operable to connect said driven element to said primary driving member for rotation or to said driving device for rotation at a constant reduced speed, a brake for stopping said driven element, actuating means for said connecting means and said brake, and means connected to said sensing means and to said driven element and operable to permit actuation of said brake only at said reduced speed and a selected one of a plurality of predetermined positions of said driven element, selector means operatively connected to said fourth mentioned means to select the desired one of the predetermined positions of said driven element, and overruling means operatively connected to said selector means operable to overrule said selector means and select another one of the predetermined stopping positions of said driven element.

6. A power and stop control mechanism comprising a primary driving member, a secondary driving member, a rotatable driven element, an electric contact device operatively connected to said driven element and having a predetermined control position at a predetermined position of said driven shaft, a brake for stopping said driven element, connecting means operable to connect said driven element to said primary driving member for rotation or to said secondary member for rotation at a constant speed, sensing means adapted to determine when said driven element is driven at said constant speed, actuating means for said connecting means and said brake, and means connected to said sensing means and to said electric contact device and operable to permit actuation of said brake only at said constant speed and said predetermined position of said driven element.

7. A power and stop control mechanism comprising a driving shaft, a rotatable driven element, a clutch operable to connect said shaft and said element, an auxiliary driving member, a second clutch operable to connect said driven element to said driving member, means driving said member and including a torque sensing device, a friction brake adapted to stop rotation of said driven element, actuating means for said clutches and brake, releasing means operable to disengage said second clutch, a timer operatively connected to said driven element, means connected to said torque sensing device and to said timer operable to permit operation of said releasing means and actuation of said brake only when the driven element is in a predetermined position and being driven at a predetermined speed.

8. A power and stop control mechanism comprising a driving shaft, a rotatable driven element, a clutch operable to connect said shaft and said element, an auxiliary driving member, a second clutch operable to connect said driven element to said driving member, means driving said member and including a torque sensing device, a friction brake adapted to stop rotation of said driven element, actuating means for said clutches and brake, releasing means operable to disengage said second clutch, a timer operatively connected to said driven element having a plurality of contact assemblies operable in different positions of said driven element, means connected to said torque sensing device and to said timer operable to permit operation of said releasing means and actuation of said brake only when the driven element is in a predetermined position and being driven at a predetermined speed.

9. A power and stop control mechanism comprising a driving shaft, a rotatable driven element, a clutch operable to connect said shaft and said element, an auxiliary driving member, a second clutch operable to connect said driven element to said driving member, means driving said member and including a torque sensing device, a friction brake adapted to stop rotation of said driven element, actuating means for said clutches and brake, releasing means operable to disengage said second clutch, a timer operatively connected to said driven element having a plurality of contact assemblies, each assembly being operable in a predetermined position of said driven element, means connected to said torque sensing device and to said timer operable to permit operation of said releasing means and actuation of said brake only when said driven element is being driven at a predetermined speed and a predetermined selected one of said contact assemblies operates, and selector means for selecting the predetermined one of said contact assemblies.

10. A power and stop control transmission mechanism comprising a driving device, a normally rotating driven element, a brake adapted gradually to stop said driven element, connecting means operable to connect said driven element to said driving device for rotation at a constant reduced speed, actuating means for said connecting means and said brake, a driving-torque sensing device comprising relatively movable members included in said driving device, and control means connected to said driven element and to said torque sensing device, said control means being operable to permit actuation of said brake only when the torque of said driving device exceeds a predetermined amount and when said driven element is in a predetermined position.

11. A power and stop control mechanism comprising a primary driving member; a secondary driving member; a rotatable driven element; clutch means for connecting said driven element to said primary driving member; coupling means for connecting said secondary driving member to said driven element; a friction brake adapted to stop rotation of said driven element; releasing means normally preventing actuation of said brake and operable to render said coupling means ineffective and permit actuation of said brake; actuating means for said clutch means, coupling means, brake, and releasing means; power transmission means operatively connected to said secondary driving member and including a torque responsive device; means connected to said torque responsive device, said releasing means and said driven element operable to permit actuation of said releasing means when said transmission means transmits torque in excess of a predetermined quantity and when said driven element is in a predetermined position.

12. A power and stop control mechanism comprising a primary driving member, a secondary driving device including a power-flow sensing means, a rotatable driven element, connecting means operable to connect said driven element to said primary driving member for rotation or to said driving device for rotation at a constant reduced speed, a brake for stopping said driven element, actuating means for said connecting means and said brake, and means connected to said sensing means and to said driven element and operable to permit actuation of said brake only at said reduced speed and a selected one of a plurality of predetermined positions of said driven element, selector means operatively connected to said fourth mentioned means to select the desired one of the predetermined positions of said driven element, and manually controlled overruling means operatively connected to said selector means operable to overrule said selector means and select another one of the predetermined stopping positions of said driven element for one stop of said driven element.

13. A sewing mechanism and a driving device for said sewing mechanism comprising a primary rotating shaft adapted to be operatively connected for driving said sewing mechanism; an auxiliary member rotated during the operation of and at a speed reduced from said primary rotating shaft for driving said sewing mechanism; electric motor means driving said shaft and said member; operator-controlled means for at will selectively controlling the effective operation of said primary shaft and auxiliary member to drive said sewing mechanism; brake means associated with said auxiliary member means for stopping said sewing mechanism; and electrical control means operatively connected to said brake means and including a timer contact operatively connected to said sewing mechanism and adapted to determine one stopping position of said sewing mechanism, a second timer contact operatively connected to said sewing mechanism and adapted to determine a second stopping position of said sewing mechanism, selector means connected to said contacts for selecting one of the stopping positions, and means to overrule said selector means and select the other of said stopping positions.

14. A sewing unit comprising a supporting table, a sewing machine carried by said table and having a needle-carrier and a rotatable main shaft operatively connected to said needle-carrier, a unitary electric power transmitter having a rotor and a rotatable driven shaft, a main clutch for connecting said driven shaft to said rotor, auxiliary driving means for rotating said driven shaft, a second clutch for connecting said driven shaft to said auxiliary driving means, brake means for gradually stopping said driven shaft, operator actuated means for controlling engagement and disengagement of said clutches and brake means, power transmission means operatively connecting said driven shaft to said rotatable main shaft, electrical control means for controlling engagement of said brake means, said electrical control means including a first switch device adapted to be opened and closed in synchronism with said rotatable main shaft, and a second switch device adapted to be closed when said main clutch is disengaged.

15. A sewing unit comprising a supporting table, a sewing machine carried by said table and having a needle-carrier and a rotatable mean shaft operatively connected to said needle-carrier, a unitary electric clutch-brake power transmitter carried by said table and having a rotor and a driven shaft, said transmitter including a clutch for connecting said driven shaft to said rotor and brake means for stopping said driven shaft, power transmission means operatively connecting said driven shaft to said rotatable main shaft, operator actuated means for engaging and disengaging said clutch and said brake means, electrical control means for controlling the stopping of said driven shaft by said brake means, said control means including electrical contact means adapted to be opened and closed in synchronism with rotation of said rotatable shaft, and a switch included in said control means for rendering said control means ineffective when said clutch is engaged.

16. A sewing unit comprising a table, a sewing machine carried by said table, said sewing machine having a needle-carrier and a rotatable shaft operatively connected to said needle-carrier, a unitary electric power clutch-brake transmitter carried by said table, said transmitter including a rotor and a driven shaft, a clutch for operatively connecting said driven shaft to said rotor, brake means for stopping said driven shaft, operator actuated means for controlling engagement and disengagement of said clutch and brake means, an electrical control system operatively connected to said sewing machine and said transmitter for permitting said brake to stop said rotatable shaft only when said rotatable shaft is in a prescribed position, said control system including a solenoid for controlling engagement of said brake means and switch means actuated by said operator actuated means for energizing and disabling said electrical control system, and power transmission means operatively connecting said driven shaft to said rotatable shaft.

17. In a control mechanism for a sewing machine, in combination, main driving means with energizing means therefor, a rotary part rotatable with and driven by the main driving means, braking means journaled for rotational movement with the rotary part and adapted to cooperate with the rotary part gradually to retard the machine, slow speed driving means operatively connected with the braking means to drive the braking means at a speed slower than the speed of the main driving means, an electrical circuit for controlling the operation of the low speed driving means, operator-influenced means for preparing the electrical circuit for controlling the low speed driving means and rendering the main driving means ineffective to drive the rotary part, means movable synchronously with the machine, and the electrical circuit including means cooperative with the synchronously movable means and effective only when the circuit has been prepared and the rotary part has been driven by said low speed driving means to a predetermined angular position to render the slow speed driving means ineffective to rotate the rotary part.

18. In a control mechanism for a sewing machine having a rotatable part with a predetermined angular home position, a main high speed driving member for normally driving the part at high speed, and means sequentially rendering the main driving member ineffective to drive the rotary part, retard the rotary part gradually, drive the part at a speed substantially less than that of the main driving member and finally stopping the rotary part in its predetermined angular home position; said means including braking means journaled for rotational movement with the rotary part and adapted gradually to retard the rotary part when initially connected therewith, a slow speed auxiliary driving member operatively connected with the braking member to drive the braking member at a predetermined low speed, an electrical circuit for controlling the operation of the auxiliary driving member, operator-influenced means for rendering the main driving member ineffective to drive the rotary part and for preparing the electrical circuit for controlling the auxiliary driving member, means movable synchronously with the rotary part, and the electrical circuit including means cooperative with the synchronously movable means and effective only when the circuit has been prepared and the rotary part has been driven by the auxiliary drive member to a predetermined angular home position to render the auxiliary driving member ineffective to rotate the rotary part.

19. In a control mechanism for a sewing machine, in combination, main driving means with energizing means therefor, a rotary part rotatable with and driven by the main driving means, first braking means journaled for rotational movement with the rotary part and adapted to cooperate with the rotary part to retard the machine, slow speed driving means operatively connected with the first braking means to drive the braking means at a speed slower than the speed of the main driving means, an electrical circuit for controlling the operation of the low speed driving means, operator-influenced means for preparing the electrical circuit for controlling the low speed driving means and rendering the main driving means ineffective to drive the rotary part, second braking means, means movable synchronously with the machine, and the electrical circuit including means cooperative with the synchronously movable means and effective only when the circuit has been prepared and the rotary part is driven by the first braking means at a predetermined rotational speed to render the slow speed driving means ineffective to rotate the rotary part and to render the second braking means effective to stop the rotary part in a predetermined angular position.

20. A power drive mechanism which comprises a frame, an electric motor having a rotor shaft journaled in the frame, a driven power take-off shaft journaled in said frame, a friction brake journaled in the frame for rotational movement, operator-influenced means connected with the frame to connect the driven power take-off shaft operatively with either the rotor shaft or the friction brake, means carried by the frame for rotating the friction brake at a speed substantially less than that of the rotor shaft, an electrical circuit for controlling the operation of the friction brake, means included in the electrical circuit which when actuated is effective to render the friction brake ineffective to rotate the power take-off shaft.

21. A power drive mechanism as claimed in claim 20 and wherein the rotor shaft, the driven power take-off shaft and the friction brake are all journaled within said frame about a common rotary axis.

22. A power drive mechanism as claimed in claim 20 and wherein the power take-off shaft is shiftable lengthwise of its rotary axis for operative engagement with the rotor shaft and the friction brake.

23. A power drive mechanism as claimed in claim 20 and wherein the friction brake is driven by the electric motor.

24. A mechanism for driving a sewing machine having a rotary shaft, comprising, a unitary electric clutch-brake power transmitter having a rotor and a driven shaft, said transmitter including a clutch for connecting said driven shaft to said rotor and brake means for stopping said driven shaft, power transmission means adapted for operatively connecting said driven shaft to said sewing machine rotary shaft, operator actuated means for engaging and disengaging said clutch and said brake means, electrical control means for controlling the stopping of said driven shaft by said brake means in a selective one of a plurality of predetermined angular positions, said control means including electrical contact means adapted to be opened and closed in synchronism with rotation of said sewing machine rotary shaft, a switch included in said control means for rendering said control means ineffective when said clutch is engaged, and selector means operatively connected to said contact device to select the desired one of the predetermined positions of said driven shaft.

25. A mechanism as claimed in claim 24 and including overruling means operatively connected to said selector means operable to overrule said selector means and select another one of the predetermined stopping positions of said driven shaft.

26. A mechanism for driving a sewing machine having a rotary shaft, comprising, a unitary electric power transmitter having a rotor and a rotatable driven shaft, a main clutch for connecting said driven shaft to said rotor, auxiliary driving means continuously driven from and at a speed substantially less than that of said rotor, a second clutch for connecting said driven shaft to said auxiliary driving means, brake means for gradually stopping said driven shaft, operator actuated means for controlling engagement and disengagement of said clutches and brake means, power transmission means adapted for operatively connecting said driven shaft to said sewing machine rotary shaft, electrical control means for controlling engagement of said brake means, said electrical control means including a first switch device adapted to be opened and closed in synchronism with said sewing machine rotary shaft, and a second switch device adapted to be closed when said main clutch is disengaged.

27. In a control mechanism for a sewing machine in combination, main driving means with energizing means therefor, a rotary part rotatable with and driven by the main driving means, braking means journaled for rotational movement with the rotary part and adapted to cooperate with the rotary part gradually to retard the machine, slow speed driving means operatively connected with the braking means to drive the braking means at a speed slower than the speed of the main driving means, an electrical circuit for controlling the operation of the low speed driving means, operator-influenced means for preparing the electrical circuit for controlling the low speed driving means and rendering the main driving means ineffective to drive the rotary part, means movable synchronously with the machine, the electrical circuit including means cooperative with the synchronously movable means and effective when the circuit has been prepared and the rotary part has been driven by said low speed driving means to a selected one of a plurality of predetermined angular positions to render the slow speed driving means ineffective to rotate the rotary part, and operator-influenced means for selecting that angular position at which the slow speed driving means is to be rendered ineffective to rotate the rotary part.

28. In a control mechanism as claimed in claim 27 and including overruling means operatively connected with the last mentioned operator-influenced means operable to overrule such means and select another one of the predetermined stopping positions of said driven shaft.

29. In a control mechanism for a sewing machine having a rotatable part with a plurality of predetermined angular home positions, a main high speed driving member for normally driving the part at high speed; means sequentially rendering the main driving member ineffective to drive the rotary part, retard the rotary part gradually, drive the part at a speed substantially less than that of the main driving member and finally stopping the rotary part in a selective one of its predetermined angular home positions; said means including braking means journaled for rotational movement with the rotary part and adapted gradually to retard the rotary part when initially connected therewith, a slow speed auxiliary driving member operatively connected with the braking member to drive the braking member at a predetermined low speed, an electrical circuit for controlling the operation of the auxiliary driving member, operator-influenced means for rendering the main driving member ineffective to drive the rotary part and for preparing the electrical circuit for controlling the auxiliary driving member, means movable synchronously with the rotary part, and the electrical circuit including means cooperative with the synchronously movable means and effective only when the circuit has been prepared and the rotary part has been driven by the auxiliary drive member to a predetermined angular home position to render the auxiliary driving member ineffective to rotate the rotary shaft; and operator-influenced means for selecting that angular home position at which the auxiliary drive member is to be rendered ineffective to rotate the rotary part.

30. A power mechanism for driving a sewing machine having a rotary shaft, comprising a frame, an electric motor having a rotor shaft journaled in the frame, a driven power take-off shaft journaled in the frame, a friction brake journaled in the frame for rotational movement, power transmission means adapted for operatively connecting the power take-off shaft with the sewing machine rotary shaft, operator-influenced means mounted on the frame to connect the power take-off shaft operatively with either the rotor shaft or the friction brake, means carried by the frame for rotating the friction brake at a speed substantially less than that of the rotor shaft, an electrical circuit for controlling the operation of the friction brake, means included in the electrical circuit which when actuated is effective to render the friction brake ineffective to rotate the power take-off shaft.

31. A power mechanism as claimed in claim 30 and wherein the rotor shaft, the driven power take-off shaft and the friction brake are all journaled within the frame about a common rotary axis, and wherein the power take-off shaft is shiftable lengthwise of the common rotary axis for operative engagement with the rotor shaft and the friction brake.

32. In control mechanism for a sewing machine, in combination: a brake element for retarding the movement of the machine, a rotary part rotatable with the machine and adapted to be engaged by said brake element, means supporting the brake element for rotational movement together with said rotating part of the machine, a slow speed driving means, means connecting said driving means with said brake element and permitting a limited angular movement of the brake element with respect to the driving means, an interrupter member movable with the machine, electrical means for controlling the operation of the slow speed driving means and the brake element, and a control member for said electrical means adapted to be moved, upon the relative limited angular movement of the brake element, by said interrupter member thereby to disconnect said slow speed driving means.

References Cited in the file of this patent

UNITED STATES PATENTS

| | | |
|---|---|---|
| Re. 15,125 | Lindquist et al. | June 14, 1921 |
| 1,186,188 | Hely | June 6, 1916 |
| 1,545,116 | Ashworth | July 7, 1925 |
| 2,362,343 | Bath | Nov. 7, 1944 |
| 2,517,567 | Hill et al. | Aug. 8, 1950 |
| 2,588,066 | Weisberg | Mar. 4, 1952 |
| 2,692,667 | Bliedung et al. | Oct. 26, 1954 |

FOREIGN PATENTS

| | | |
|---|---|---|
| 527,908 | Germany | June 23, 1931 |

UNITED STATES PATENT OFFICE

CERTIFICATE OF CORRECTION

Patent No. 2,847,956                                 August 19, 1958

Arthur N. Hale

It is hereby certified that error appears in the printed specification of the above numbered patent requiring correction and that the said Letters Patent should read as corrected below.

Column 11, line 33, claim 15, for "mean" read -- main --.

Signed and sealed this 28th day of October 1958.

(SEAL)
Attest:
KARL H. AXLINE
Attesting Officer

ROBERT C. WATSON
Commissioner of Patents